(12) United States Patent
Janakiraman et al.

(10) Patent No.: US 10,798,232 B2
(45) Date of Patent: Oct. 6, 2020

(54) PRESENTING A COLORING PATTERN BY A CASE OF A MOBILE DEVICE BASED ON RECEIVED CONTENT

(71) Applicant: International Business Machines Corporation, Armonk, NY (US)

(72) Inventors: Janani Janakiraman, Austin, TX (US); Su Liu, Austin, TX (US); Fang Lu, Billerica, MA (US); Nadiya Kochura, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/224,958

(22) Filed: Dec. 19, 2018

(65) Prior Publication Data

US 2020/0204668 A1   Jun. 25, 2020

(51) Int. Cl.
  *H04M 1/02*   (2006.01)
  *H04L 12/58*  (2006.01)
  *G06F 1/16*   (2006.01)

(52) U.S. Cl.
  CPC ........ *H04M 1/0283* (2013.01); *G06F 1/1656* (2013.01); *H04L 51/24* (2013.01)

(58) Field of Classification Search
  CPC ..... H04M 1/0283; G06F 1/1656; H04L 51/24
  See application file for complete search history.

(56) References Cited

U.S. PATENT DOCUMENTS

| 7,236,588 | B2 * | 6/2007 | Gartrell | H04M 1/0283 |
| | | | | 379/433.01 |
| 8,159,750 | B2 * | 4/2012 | Yokota | G02B 6/0001 |
| | | | | 359/618 |
| 9,300,347 | B1 * | 3/2016 | Coverstone | H04B 1/3888 |
| 2013/0154826 | A1 | 6/2013 | Ratajczyk | |
| 2014/0200054 | A1 | 7/2014 | Fraden | |
| 2015/0163321 | A1 * | 6/2015 | Abou Mahmoud | H04L 51/04 |
| | | | | 715/745 |
| 2015/0276189 | A1 * | 10/2015 | Palfreyman | F21V 21/14 |
| | | | | 362/235 |
| 2016/0117865 | A1 * | 4/2016 | Nair | A63F 13/63 |
| | | | | 345/419 |
| 2017/0023982 | A1 | 1/2017 | Rayeski | |
| 2017/0205854 | A1 | 7/2017 | Zenoff | |
| 2017/0358441 | A1 * | 12/2017 | Nanchung | H01J 7/22 |
| 2018/0197460 | A1 * | 7/2018 | Johnson | B60N 3/048 |
| 2018/0225933 | A1 * | 8/2018 | Park | H04L 51/12 |

FOREIGN PATENT DOCUMENTS

| CN | 104853010 A | 8/2015 |
| CN | 207926692 U | 9/2018 |
| WO | WO 2016/101666 A1 | 6/2016 |

* cited by examiner

*Primary Examiner* — Magdi Elhag
(74) *Attorney, Agent, or Firm* — David M. Quinn

(57) ABSTRACT

Presenting a coloring pattern by a case of a mobile device according to received content includes receiving, by the mobile device, content; determining, based on the content, a coloring pattern; generating, based on the coloring pattern, a heat pattern in an inductive mesh of the mobile device; and presenting, by a thermally activated material included in the case of the mobile device and in thermal contact with the inductive mesh, the coloring pattern.

20 Claims, 7 Drawing Sheets ional/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

PRESENTING A COLORING PATTERN BY A CASE OF A MOBILE DEVICE BASED ON RECEIVED CONTENT

BACKGROUND

Field of the Invention

The field of the invention is data processing, or, more specifically, methods, apparatus, and products for presenting a coloring pattern by a case of a mobile device based on received content.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Devices such as mobile devices may receive content. The mobile device may present a notification indicating that the content was received. Typically, notifications appear similar for all content of a particular type. For example, all notifications for received emails may appear similar aside from preview text within the notification.

SUMMARY

A method of presenting a coloring pattern by a case of a mobile device based on received content may comprise receiving, by the mobile device, content; determining, based on the content, a coloring pattern; generating, based on the coloring pattern, a heat pattern in an inductive mesh of the mobile device; and presenting, by a thermally activated material included in the case of the mobile device and in thermal contact with the inductive mesh, the coloring pattern.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
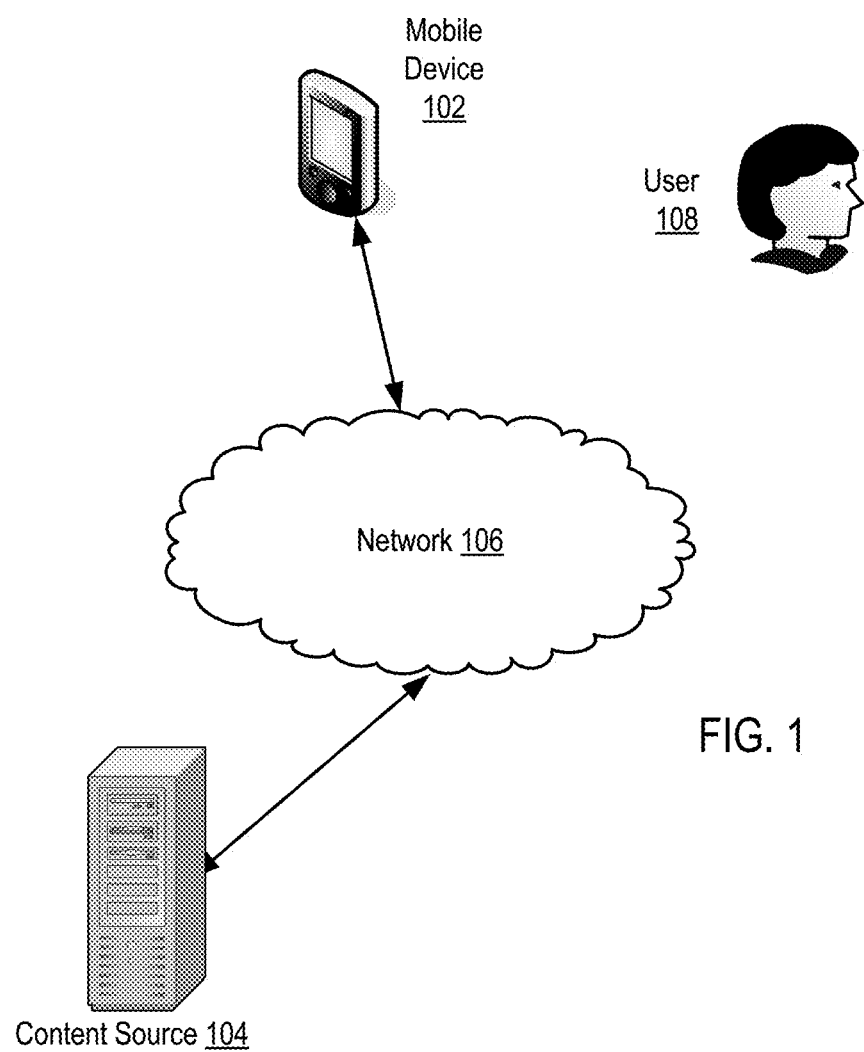
FIG. 1 is a diagram of an example system configured for presenting a coloring pattern by a case of a mobile device based on received content according to embodiments of the present disclosure.

Exemplary methods, apparatus, and products for of presenting a coloring pattern by a case of a mobile device based on received content in accordance with the present invention are described with reference to the accompanying drawings, beginning with FIG. 1. FIG. 1 sets forth a network diagram of a system configured for of presenting a coloring pattern by a case of a mobile device according to embodiments of the present invention. The system of FIG. 1 includes a mobile device 102 which is connected to a content source 104 via a network 106.

The mobile device 102 may comprise a phone, a smartphone, a laptop, a tablet, or any other portable and/or self-contained computing device as can be appreciated. The mobile device 102 includes an internal inductive mesh. The inductive mesh receives current produced by the mobile device 102 (e.g., by an electromagnet and oscillator within the mobile device 102) and generates a current within a conductor. The inductive mesh may include one or more induction elements. Thus, one or more areas of the inductive mesh may be separately heated. The induction elements may be separated by a magnetically insulated or thermally insulated material so as to prevent induction and/or heat transfer between induction elements.

The case of the mobile device 102 can include a thermally activated material. The thermally activated material is any material that may change color when exposed to heat. The thermally activated material may be in contact with the conductor of the inductive mesh. In other words, the thermally activated material may be said to be thermally coupled to the inductive mesh. Where thermally activated material is conductive, the thermally activated material may be directly heated by the inductive mesh without an additional conductive material to transfer heat to the thermally activated material. The case of the mobile device 102 may also include an external insulation layer to protect a user 108 from direct contact with heat produced by the inductive mesh and transferred via the thermally activated material. The insulation layer may be transparent so as to allow a user 108 to observe color changes in the thermally activated material.

The content source 104 may be a computing device configured to send content to the mobile device 102 via the network 106. Accordingly, the content source 104 may comprise a server, a plurality of servers, a virtual machine, another mobile device, a wearable computing device, or other computing device as can be appreciated. The content sent to the mobile device may comprise any digital or multimedia content as can be appreciated, including text data, audio data, video data, image data, or combinations thereof. Accordingly, the content may comprise an email, a text message, a voice mail, an audio file, a video file, a push notification, or other content as can be appreciated.

The network 106 may provide a communication pathway for content from the content source 104 to the mobile device 102. The network 106 may comprise one or more Wide-Area Networks (WANs), Local Area Networks (LANs), Personal Area Networks (PANs), Internets, Intranets, wired networks, wireless networks, cellular networks, mesh networks, or other networks 106 as can be appreciated.

The mobile device 102 may be configured to receive content from the content source 104 via the network 106. For example, the content source 104 may comprise an email server, and the content may comprise an email message. As another example, the content source 104 may comprise a server of an emergency notice system, and the content may comprise a notification relating to an emergency (e.g., a weather emergency). As a further example, the content source 104 may comprise a wearable device (e.g., a smart watch or fitness monitor), and the content may comprise a message relating to the health or activity of the user 108.

In response to receiving the content, the mobile device 102 may determine a coloring pattern to be presented by heating the thermally activated material via the inductive mesh. The coloring pattern may comprise a particular color, e.g., red, yellow, green, etc. to be presented. The coloring pattern may also include an arrangement of one or more colored areas, with each of the one or more colored areas being a particular (e.g., same or different) color. For example, the arrangement may include a grid or matrix of dots or other shapes, a line or series of dots or other shapes, or other arrangements as can be appreciated. Determining the coloring pattern may include identifying one or more attributes associated with the content. The one or more attributes associated with the content may include, for example, a sender of the content (e.g., a sender of an email, a caller for a voicemail, an originating application for a push notification), a type of content (e.g., voicemail, email, text message, emergency alert), whether an attachment is included, a type of attachment, etc.

Determining the one or more attributes may comprise performing an image analysis on the content and/or an attachment included in the content. For example, the one or more attributes may include identified person(s) in an image or video that are identified through image analysis. Determining the one or more attributes may also include performing a sentiment analysis on the content. For example, the one or more attributes may include a type of sentiment (e.g., positive or negative sentiment). The one or more attributes may also include a flag or identifier indicating a change in sentiment. For example, the content may be an email message in a chain of emails. The one or more attributes may indicate a change in sentiment from a previous message in the chain. Determining the one or more attributes may also include performing a relationship analysis on the senders and/or recipients of the content. Determining the one or more attributes may include identifying one or more keywords. Accordingly, the one or more attributes may include the identified one or more keywords, or a flag or identifier indicating the presence of one or more particular keywords. Determining the one or more attributes may also include performing an audio analysis on the content. For example, where the content is a voicemail, determining the one or more attributes may include applying a speech-to-text function to the content to generate text data. Accordingly, determining the one or more attributes may include applying a keyword analysis, sentiment analysis, or other text analysis to the text data generated from audio content.

Determining the coloring pattern may also include identifying a data structure mapping the determined one or more attributes to the coloring pattern. The data structure may include a table entry, database entry, or other data structure. As an example, assume the following table mapping attributes to a coloring pattern.

| Content Type | Sender | Attachment? | Coloring Pattern |
|---|---|---|---|
| Email | Supervisor | Yes | Red |
| Email | Parent | Yes | Red |
| Email | Parent | No | Green |
| Text Message | Spouse | Yes | Yellow |
| Text Message | Spouse | No | Yellow |

Here, the example table includes attributes for the "Content Type," "Sender," and "Attachment?" indicating whether the content includes an attached file. Identifying a data structure mapping the determined one or more attributes to the coloring pattern may include identifying a matching data structure that maps each of the determined one or more attributes (e.g., an exact match). Using the example table above, if an email message is received from a supervisor with an attachment, the table entry mapped to the coloring pattern "red" would be identified.

If there is no matching data structure that maps each of the determined one or more attributes, identifying a data structure may include identifying a nearest matching data structure. Continuing with the example above, assume an email message is received from a supervisor without an attachment. No entry matching each attribute of the received email message is included in the example table. The nearest matching data structure may be identified as a data structure matching a greatest number of the determined one or more attributes. Here, the ["Email", "Parent", "No"] entry mapped to the color "Green" matches two out of the three attributes. Accordingly, the coloring pattern may be determined as "Green."

The nearest matching data structure may also be identified based on a priority of attributes. For example, assume a text message is received from a supervisor without an attachment. Assume the "Content Type" attribute has a greater priority than the "Sender" and "Attachment?" attributes. As the text message matches the greater priority "Content Type" attribute, the coloring pattern may be determined as "Yellow." The data structure may also indicate a default mapping to a coloring pattern for content that does not exactly match the one or more attributes of other data structure entries (e.g., a default mapping for content of a particular type, a default mapping for content from a particular sender). Thus, data structures mapping particular combinations of attributes to a coloring pattern may serve to supersede or override default mappings.

After determining the coloring pattern, the mobile device 102 may generate a heat pattern corresponding to the coloring pattern in the inductive mesh. Accordingly, the mobile device 102 may generate a particular current or magnetic field to inductively heat a conductor of the inductive mesh. The thermally activated material may then present the coloring pattern, as the thermally activated material is thermally coupled to the inductive mesh and will react to the generated heat. The coloring pattern may then be observed by a user 108 so as to be informed about the received content.

The arrangement of devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Presenting a coloring pattern by a case of a mobile device based on received content in accordance with the present invention is generally implemented with computers, that is, with automated computing machinery. In the system of FIG. 1, for example, all the mobile device 102 and content source 104 are implemented to some extent at least as computers. For further explanation, therefore, FIG. 2 sets forth a block diagram of automated computing machinery comprising an exemplary computer 202 configured for presenting a coloring pattern by a case of a mobile device based on received content according to embodiments of the present invention. The computer 202 of FIG. 2 includes at least one computer processor 204 or 'CPU' as well as random access memory 206 (RAM') which is connected through a high speed memory bus 208 and bus adapter 210 to processor 204 and to other components of the computer 202.

Stored in RAM 205 is a color control module 212, a module of computer program instructions for presenting a coloring pattern by a case of a mobile device based on received content. Also stored RAM 206 is content 214 received from a content source 104.

Also stored in RAM 206 is an operating system 216. Operating systems useful in computers configured for presenting a coloring pattern by a case of a mobile device based on received content according to embodiments of the present invention include UNIX™, Linux™, Microsoft XP™, AIX™, IBM's i5/OS™, and others as will occur to those of skill in the art. The operating system 216, color control module 212, and content 214 in the example of FIG. 2 are shown in RAM 206, but many components of such software typically are stored in non-volatile memory also, such as, for example, on data storage 218.

Figure 2:
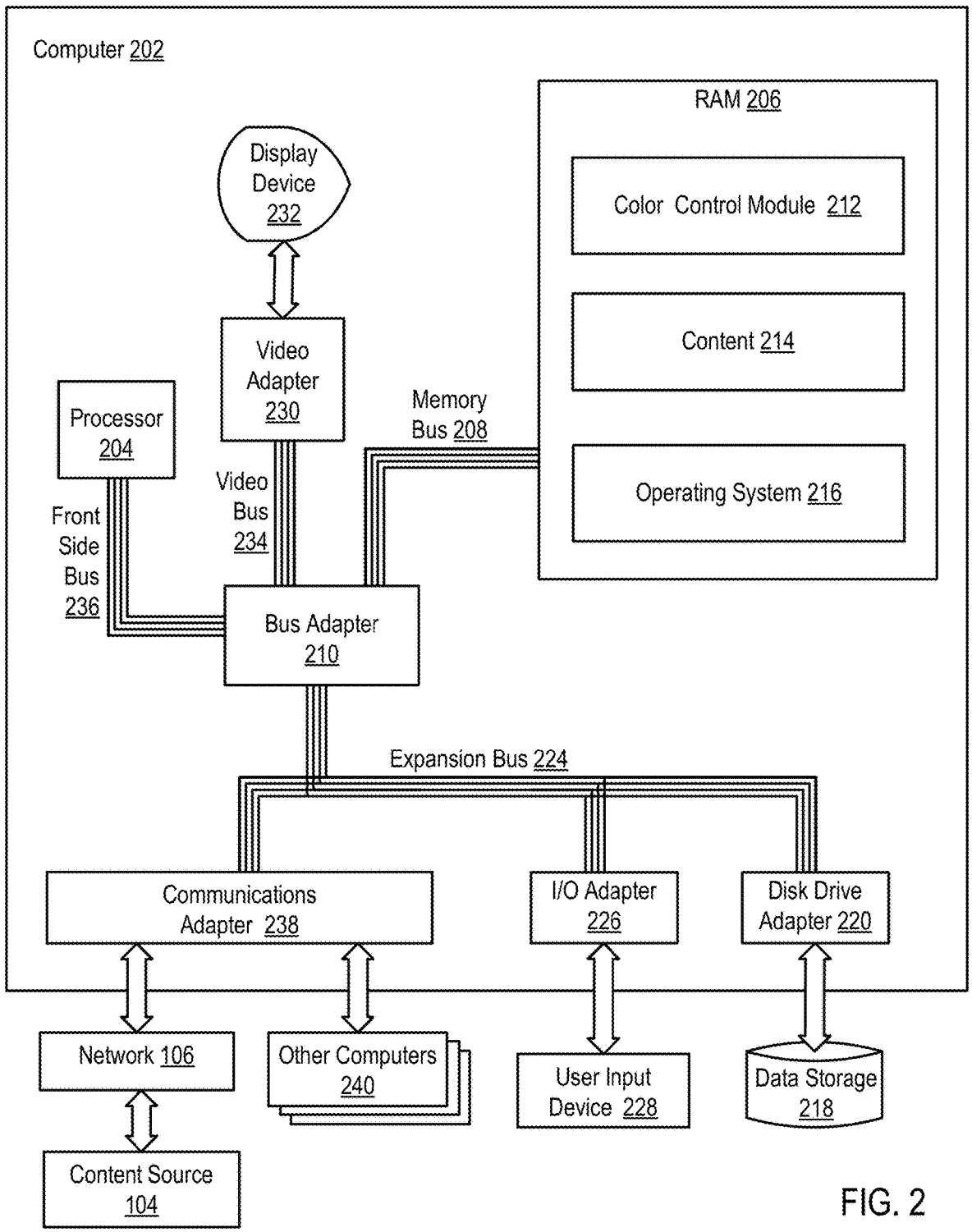
FIG. 2 is a block diagram of an example computing device configured for presenting a coloring pattern by a case of a mobile device based on received content according to embodiments of the present disclosure.

The computer 202 of FIG. 2 includes disk drive adapter 220 coupled through expansion bus 224 and bus adapter 210 to processor 204 and other components of the computer 202. Disk drive adapter 220 connects non-volatile data storage 218 to the computer 202 in the form of a disk drive. Disk drive adapters useful in computers configured for presenting a coloring pattern by a case of a mobile device based on received content according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 202 of FIG. 2 includes one or more input/output ('I/O') adapters 226. I/O adapters implement user-oriented input/output through, for example, software drivers and computer hardware for controlling output to display devices such as computer display screens, as well as user input from user input devices 228 such as keyboards and mice. The example computer 202 of FIG. 2 includes a video adapter 230, which is an example of an I/O adapter specially designed for graphic output to a display device 232 such as a display screen, touch screen display, or computer monitor. Video adapter 230 is connected to processor 204 through a high speed video bus 234, bus adapter 210, and the front side bus 236, which is also a high speed bus.

The exemplary computer 202 of FIG. 2 includes a communications adapter 238 for data communications with other computers 240 and for data communications with a data communications network 106. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for presenting a coloring pattern by a case of a mobile device based on received content according to embodiments of the present invention include modems for wired dial-up communications, Ethernet (IEEE 802.3) adapters for wired data communications, and 802.11 adapters for wireless data communications.

Figure 3:
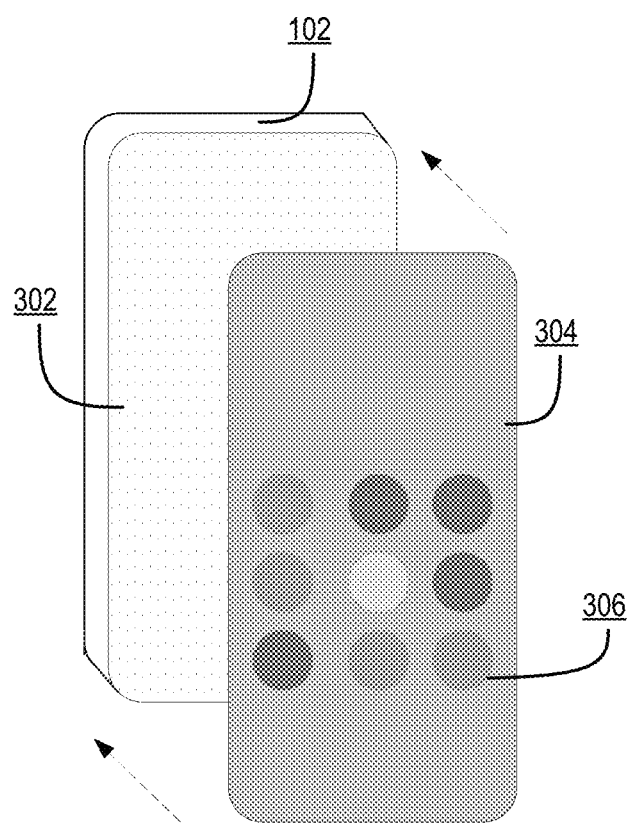
FIG. 3 is a diagram of an example mobile device case configured for presenting a coloring pattern based on received content according to embodiments of the present disclosure.

FIG. 3 shows an example diagram of a disassembled rear casing of a mobile device 102. The mobile device 102 includes a conductor 302 of an inductive mesh. Magnetic fields generated by the inductive mesh cause heat to be generated in the conductor 302. The mobile device 102 also includes a thermally activated material 304 that, when assembled, is thermally coupled (e.g., in contact) with the conductor 302. Thus, heat in the conductor 302 is transferred to the thermally activated material 304, causing a change in color. Here, the change in color includes a grid of dots 306, which may each be a different color or shade. The particular change in color may be affected by the heat of the conductor 302, which is controlled by the mobile device 102 as interfaced with the inductive mesh.

Figure 4:
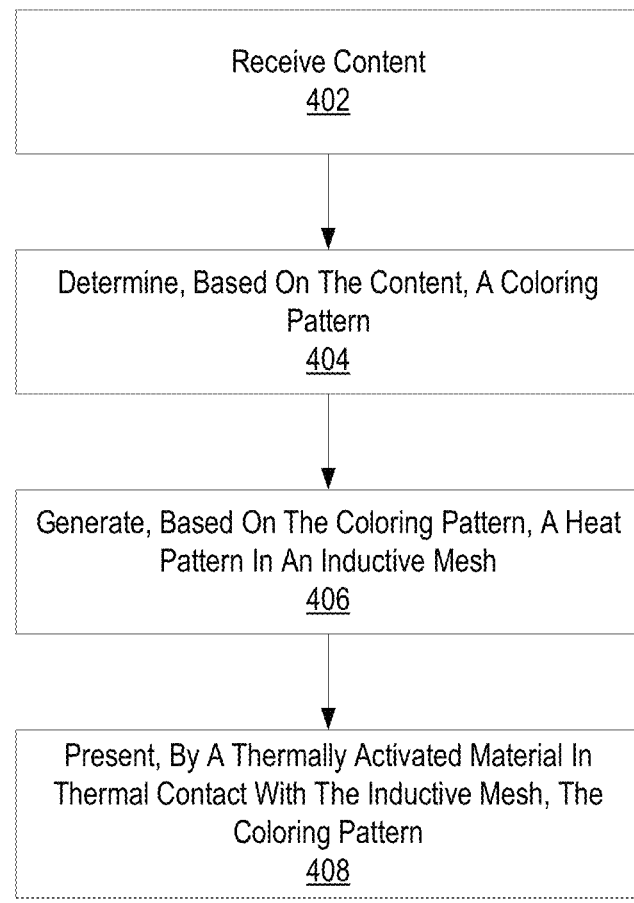
FIG. 4 is a flowchart of an example method of presenting a coloring pattern by a case of a mobile device based on received content according to embodiments of the present disclosure.

For further explanation, FIG. 4 sets forth a flow chart illustrating an exemplary method for presenting a coloring pattern by a case of a mobile device based on received content according to embodiments of the present invention that includes receiving 402 content (e.g., by a mobile device 102 from a content source 104). The mobile device 102 may receive content from the content source 104 via the network 106. For example, the content source 104 may comprise an email server, and the content may comprise an email message. As another example, the content source 104 may comprise a server of an emergency notice system, and the content may comprise a notification relating to an emergency (e.g., a weather emergency). As a further example, the content source 104 may comprise a wearable device (e.g., a smart watch or fitness monitor), and the content may comprise a message relating to the health or activity of the user 108. In another example, the content source 104 may comprise a server facilitating the operation of an application or service installed on the mobile device 102. Accordingly, the content may comprise a push notification associated with the application or service.

The method of FIG. 4 may further comprise determining 404, based on the content, a coloring pattern. The coloring pattern may be determined based on one or more attributes of the content. Such attributes can include a type of the content (e.g., an email message, a text message, a push notification, a voice mail), a sender of the content (e.g., a sender of a message, a caller of a voicemail, an application associated with a push notification), a recipient of the content (e.g., a recipient and/or group of recipients of a message), whether an attachment is included in the content, a type of attachment included in the content (e.g., an image attachment, an audio attachment, a video attachment, a document attachment, an executable attachment), or other attribute.

The one or more attributes may also include one or more keywords included in the content (e.g., keywords in text content, keywords in audio content as determined by audio analysis, etc.). The one or more attributes may also include a flag or indication of the presence of a predetermined keyword in the content. The one or more attributes may further include a sentiment of the content (e.g., as determined by sentiment analysis) or an indication of a change in sentiment relative to previously received content (e.g., a previous message in a chain or series of email messages or text messages).

The method of FIG. 4 may further include generating 406, based on the coloring pattern, a heat pattern in an inductive mesh of the mobile device 102. Generating, based on the coloring pattern, a heat pattern in the inductive mesh of the mobile device 102 may include generating a particular current or magnetic field to inductively heat a conductor of the inductive mesh.

The method of FIG. 4 may further include presenting 408, by thermally activated material in the case of the mobile device 102 and in thermal contact with the inductive mesh (e.g., a conductor of the inductive mesh), the coloring pattern. The coloring pattern may then be observed by a user 108 so as to be informed about the received content.

Figure 5:
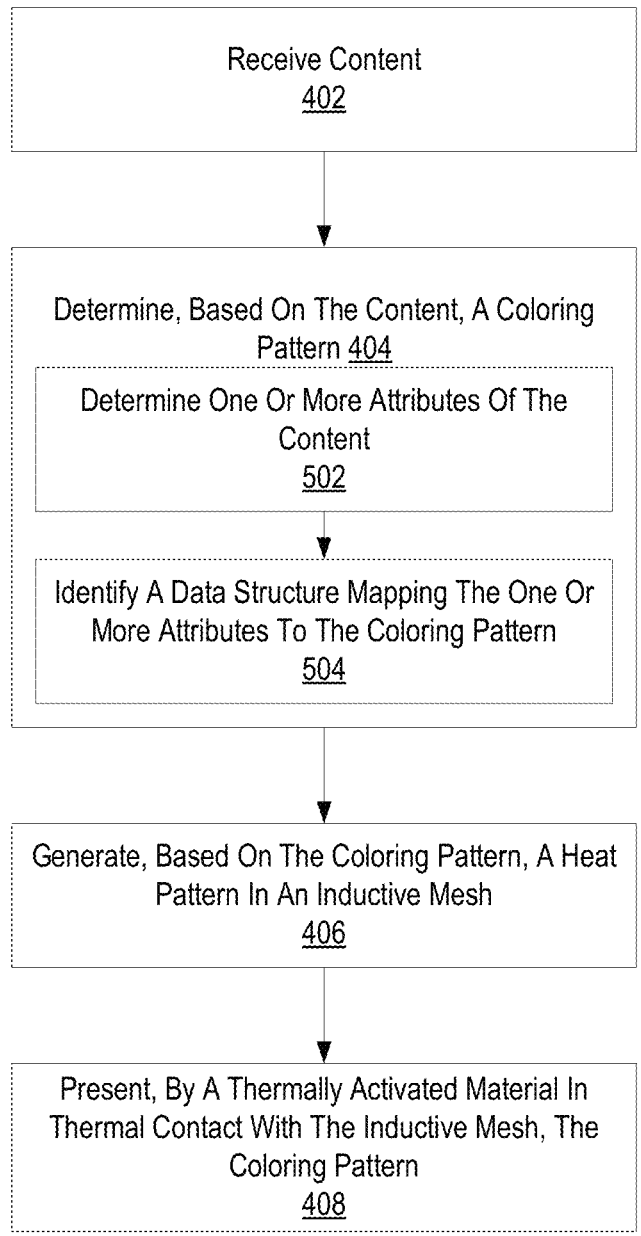
FIG. 5 is a flowchart of an example method of presenting a coloring pattern by a case of a mobile device based on received content according to embodiments of the present disclosure.

For further explanation, FIG. 5 sets forth a flow chart illustrating a further exemplary method for presenting a coloring pattern by a case of a mobile device according to received content according to embodiments of the present invention that includes receiving 402 content, determining 404, based on the content, a coloring pattern, generating 406, based on the coloring pattern, a heat pattern in an inductive mesh, and presenting 408, by a thermally activated material in thermal contact with the inductive mesh, the coloring pattern.

FIG. 5 differs from FIG. 4 in that determining 404, based on the content, a coloring pattern comprises determining 502 one or more attributes associated with the content. The one or more attributes associated with the content may include, for example, a sender of the content (e.g., a sender of an email, a caller for a voicemail, an originating application for a push notification), a type of content (e.g., voicemail, email, text message, emergency alert), whether an attachment is included, a type of attachment, etc.

Determining the one or more attributes may comprise performing an image analysis on the content and/or an attachment included in the content. For example, the one or more attributes may include identified person(s) in an image or video that are identified through image analysis. Determining the one or more attributes may also include performing a sentiment analysis on the content. For example, the one or more attributes may include a type of sentiment (e.g., positive or negative sentiment). The one or more attributes may also include a flag or identifier indicating a change in sentiment. For example, the content may be an email message in a chain of emails. The one or more attributes may indicate a change in sentiment from a previous message in the chain. Determining the one or more attributes may also include performing a relationship analysis on the senders and/or recipients of the content. Determining the one or more attributes may include identifying one or more keywords. Accordingly, the one or more attributes may include the identified one or more keywords, or a flag or identifier indicating the presence of one or more particular keywords. Determining the one or more attributes may also include performing an audio analysis on the content. For example, where the content is a voicemail, determining the one or more attributes may include applying a speech-to-text function to the content to generate text data. Accordingly, determining the one or more attributes may include applying a keyword analysis, sentiment analysis, or other text analysis to the text data generated from audio content.

FIG. 5 further differs from FIG. 4 in that determining 404, based on the content, a coloring pattern comprises identifying 504 a data structure mapping the one or more attributes to the coloring pattern. The data structure may include a table entry, database entry, or other data structure. As an example, assume the following table mapping attributes to a coloring pattern.

| Content Type | Sender | Attachment? | Coloring Pattern |
|---|---|---|---|
| Email | Supervisor | Yes | Red |
| Email | Parent | Yes | Red |
| Email | Parent | No | Green |
| Text Message | Spouse | Yes | Yellow |
| Text Message | Spouse | No | Yellow |

Here, the example table includes attributes for the "Content Type," "Sender," and "Attachment?" indicating whether the content includes an attached file. Identifying a data structure mapping the determined one or more attributes to the coloring pattern may include identifying a matching data structure that maps each of the determined one or more attributes (e.g., an exact match). Using the example table above, if an email message is received from a supervisor with an attachment, the table entry mapped to the coloring pattern "red" would be identified. Identifying a data structure mapping the determined one or more attributes to the coloring pattern may also comprise identifying a data structure having a greatest degree of similarity to the determined one or more attributes. Identifying the data structure mapping the determined one or more attributes to the coloring pattern may also comprise determining a data structure mapping a default coloring pattern to a subset of the determined attributes (e.g., a default coloring pattern for email messages, a default coloring pattern for content received from a supervisor). The default coloring pattern may be identified in response to no data structure mapping each of the determined attributes to a coloring pattern. The default coloring pattern may also be identified as overriding (e.g., taking precedence) over the determined one or more attributes (e.g., all content received from a family member is associated with a particular coloring pattern regardless of other attributes).

Figure 6:
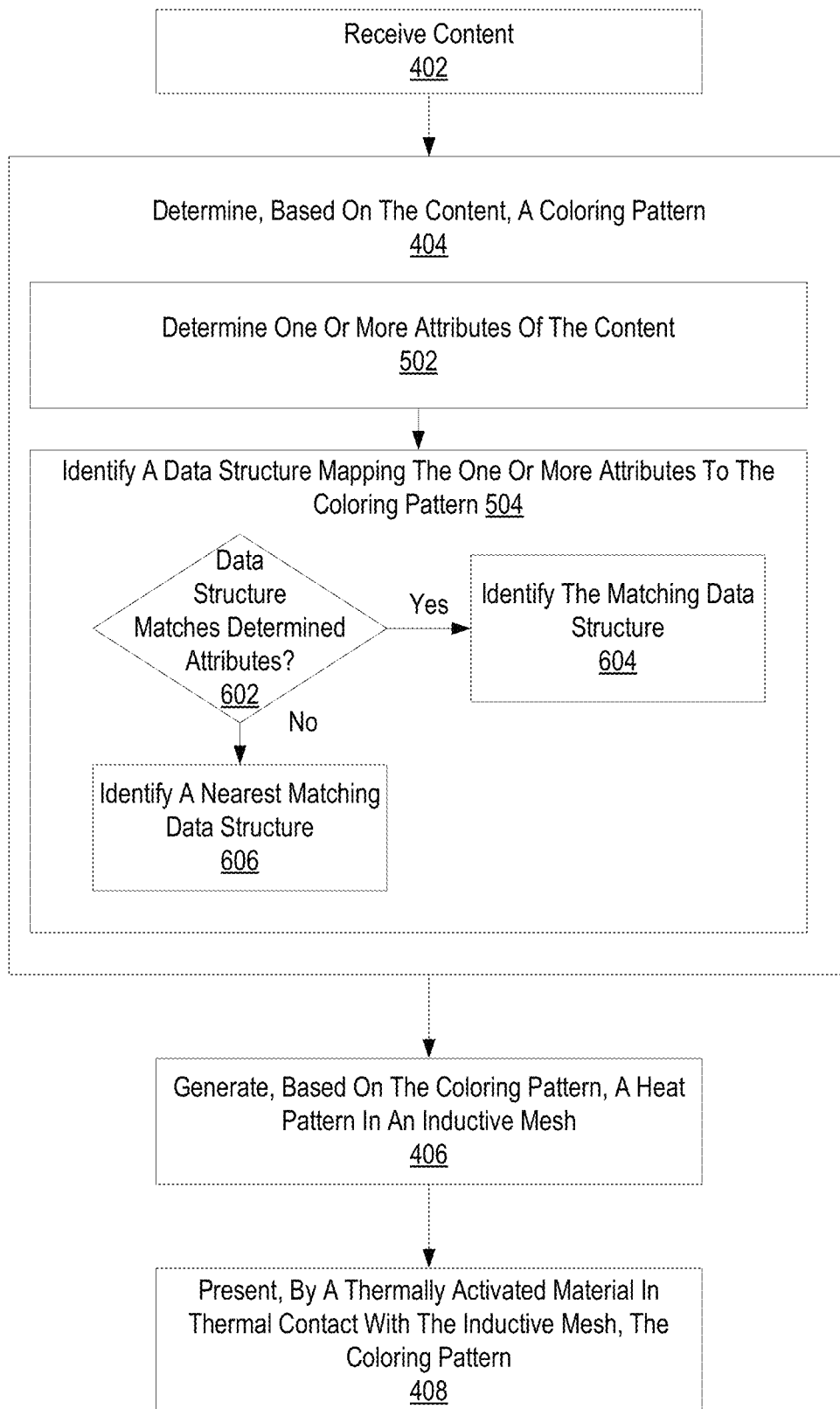
FIG. 6 is a flowchart of an example method of presenting a coloring pattern by a case of a mobile device based on received content according to embodiments of the present disclosure.

For further explanation, FIG. 6 sets forth a flow chart illustrating a further exemplary method for presenting a coloring pattern by a case of a mobile device according to received content according to embodiments of the present invention that includes receiving 402 content, determining 404, based on the content, a coloring pattern by determining 502 one or more attributes of the content and identifying 504 a data structure mapping the one or more attributes to the coloring pattern, generating 406, based on the coloring pattern, a heat pattern in an inductive mesh, and presenting 408, by a thermally activated material in thermal contact with the inductive mesh, the coloring pattern.

FIG. 6 differs from FIG. 5 in that identifying 504 a data structure mapping the one or more attributes to the coloring pattern comprises determining 602 if a data structure matches the determined attributes (e.g., maps each of the determined attributes to a coloring pattern). If so, the matching data structure is identified 604 as the identified data structure.

If there is no matching data structure that maps each of the determined one or more attributes, identifying a data structure may include identifying 606, as the identified data structure, a nearest matching data structure. The nearest matching data structure may be identified as a data structure matching a greatest number of the determined one or more attributes (e.g., having a greatest degree of similarity to the determined one or more attributes). The nearest matching data structure may also be identified based on a priority of attributes. Continuing the example of FIG. 5, assume a text message is received from a supervisor without an attachment. Assume the "Content Type" attribute has a greater priority than the "Sender" and "Attachment?" attributes. As the text message matches the greater priority "Content Type" attribute, the coloring pattern may be determined as "Yellow." The data structure may also indicate a default mapping to a coloring pattern for content that does not exactly match the one or more attributes of other data structure entries (e.g., a default mapping for content of a particular type, a default mapping for content from a particular sender). Thus, data structures mapping particular combinations of attributes to a coloring pattern may serve to supersede or override default mappings.

Figure 7:
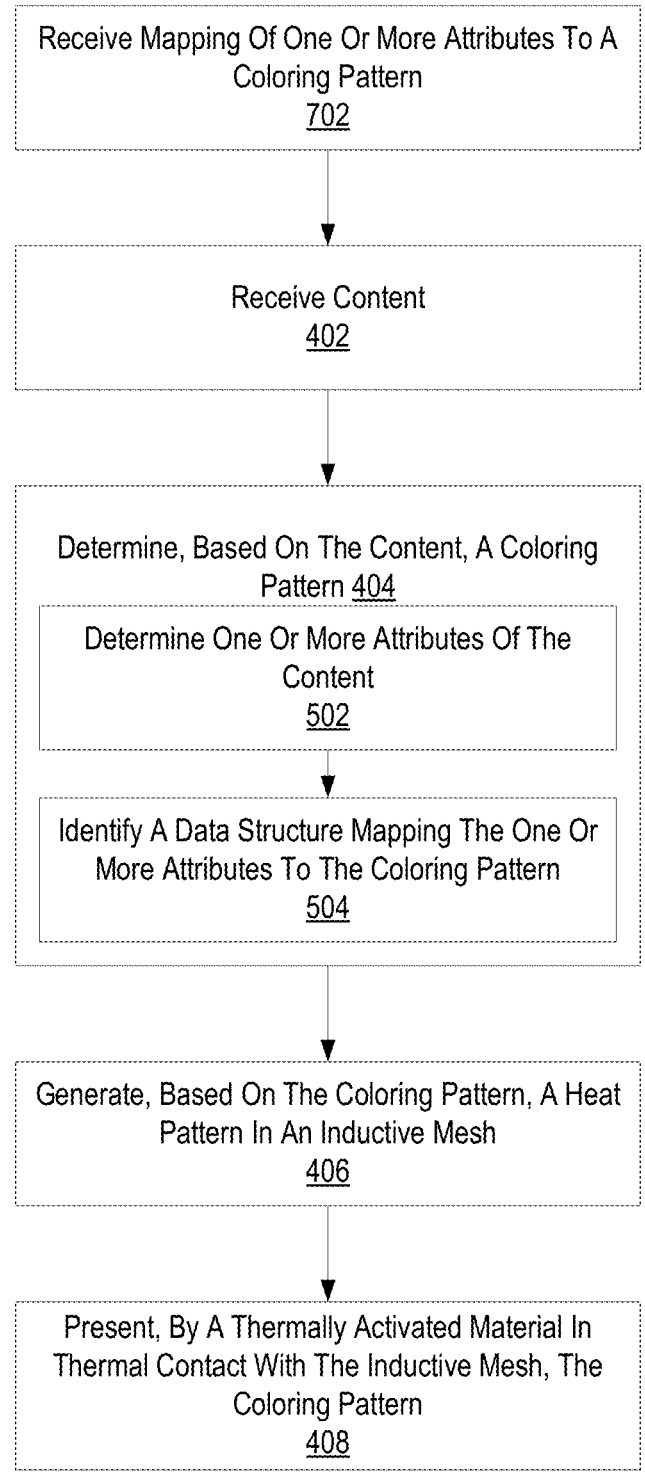
FIG. 7 is a flowchart of an example method of presenting a coloring pattern by a case of a mobile device based on received content according to embodiments of the present disclosure.

For further explanation, FIG. 7 sets forth a flow chart illustrating a further exemplary method for presenting a coloring pattern by a case of a mobile device according to received content according to embodiments of the present invention that includes receiving 402 content, determining 404, based on the content, a coloring pattern, generating 406, based on the coloring pattern, a heat pattern in an inductive mesh, and presenting 408, by a thermally activated material in thermal contact with the inductive mesh, the coloring pattern.

FIG. 7 differs from FIG. 4 in that the method further comprises receiving 702 a mapping of one or more attributes to a coloring pattern. The mapping of one or more attributes to a coloring pattern may be received such that, when content is received associated with the one or more attributes, the mapped coloring pattern is presented by the thermally activated material of the case of the mobile device 102. The mapping of the one or more attributes to the coloring pattern may be received via a user interface. The user interface may be generated and/or displayed by the mobile device 102 or another device.

The mapping of the one or more attributes to the coloring pattern may be received as part of data received and/or installed by the mobile device 102, such as an application patch, software update, operating system update, etc. The mapping of the one or more attributes may also be received via an application program interface (API) exposed by the mobile device 102 or an application executed by the mobile device 102. The received mapping of the one or more attributes to the coloring pattern may be stored by the mobile device 102 in a data structure, e.g., a table, a database, etc.

In view of the explanations set forth above, readers will recognize that the benefits of presenting a coloring pattern by a case of a mobile device according to received content according to embodiments of the present invention include:

Coloring patterns may represent context-specific information associated with received content. Thus, a user is presented with additional contextual information for the received content.

The coloring patterns provide a silent and unobtrusive way to inform a user of received content.

The coloring patterns may be specifically mapped according to user preferences, thus informing the user regarding the received content while remaining obfuscated to other observers.

Exemplary embodiments of the present invention are described largely in the context of a fully functional computer system for presenting a coloring pattern by a case of a mobile device according to received content. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of presenting a coloring pattern by a case of a mobile device based on received content, the method comprising:
    receiving, by the mobile device, content;
    determining, based on the content, a coloring pattern;
    generating, based on the coloring pattern and a plurality of magnetic fields generated within the mobile device by an inductive mesh, a heat pattern in the inductive mesh, wherein the inductive mesh is included within the mobile device; and
    presenting, by a thermally activated material included in the case of the mobile device and in thermal contact with the inductive mesh, the coloring pattern.

2. The method of claim 1, wherein determining the coloring pattern comprises:
    identifying one or more attributes of the content; and
    identifying a data structure mapping the one or more attributes to the coloring pattern.

3. The method of claim 2, wherein identifying the one or more attributes of the content comprises performing one or more of an image analysis, an audio analysis, or a relationship analysis to the content.

4. The method of claim 2, wherein identifying the one or more attributes of the content comprises identifying a type of the content or a source of the content.

5. The method of claim 2, wherein identifying the data structure mapping the one or more attributes to the coloring pattern comprises:
   identifying, if a matching data structure matches each of the one or more attributes, the matching data structure as the identified data structure; and
   identifying, if no data structure matches each of the one or more attributes, a nearest matching data structure as the identified data structure.

6. The method of claim 5, wherein identifying, if no data structure matches each of the one or more attributes, the nearest matching data structure as the identified data structure is based on a priority of the one or more attributes.

7. The method of claim 1, further comprising receiving a mapping of the one or more attributes to the coloring pattern.

8. An apparatus for presenting a coloring pattern by a case of the apparatus based on received content, the apparatus comprising a computer processor, a computer memory operatively coupled to the computer processor, the computer memory having disposed within it computer program instructions that, when executed by the computer processor, cause the apparatus to carry out the steps of:
   receiving content;
   determining, based on the content, a coloring pattern;
   generating, based on the coloring pattern and a plurality of magnetic fields generated within the mobile device by an inductive mesh, a heat pattern in the inductive mesh, wherein the inductive mesh is included within the apparatus; and
   presenting, by a thermally activated material included in the case of the apparatus and in thermal contact with the inductive mesh, the coloring pattern.

9. The apparatus of claim 8, wherein determining the coloring pattern comprises:
   identifying one or more attributes of the content; and
   identifying a data structure mapping the one or more attributes to the coloring pattern.

10. The apparatus of claim 9, wherein identifying the one or more attributes of the content comprises performing one or more of an image analysis, an audio analysis, or a relationship analysis to the content.

11. The apparatus of claim 9, wherein identifying the one or more attributes of the content comprises identifying a type of the content or a source of the content.

12. The apparatus of claim 9, wherein identifying the data structure mapping the one or more attributes to the coloring pattern comprises:
   identifying, if a matching data structure matches each of the one or more attributes, the matching data structure as the identified data structure; and
   identifying, if no data structure matches each of the one or more attributes, a nearest matching data structure as the identified data structure.

13. The apparatus of claim 12, wherein identifying, if no data structure matches each of the one or more attributes, the nearest matching data structure as the identified data structure is based on a priority of the one or more attributes.

14. The apparatus of claim 8, wherein the steps further comprise receiving a mapping of the one or more attributes to the coloring pattern.

15. A computer program product for presenting a coloring pattern by a case of a mobile device based on received content, the computer program product disposed upon a computer readable medium, the computer program product comprising computer program instructions that, when executed, cause a computer to carry out the steps of:
   receiving content;
   determining, based on the content, a coloring pattern;
   generating, based on the coloring pattern and a plurality of magnetic fields generated within the mobile device by an inductive mesh, a heat pattern in the inductive mesh is included within the mobile device; and
   presenting, by a thermally activated material included in the case of the mobile device and in thermal contact with the inductive mesh, the coloring pattern.

16. The computer program product of claim 15, wherein determining the coloring pattern comprises:
   identifying one or more attributes of the content; and
   identifying a data structure mapping the one or more attributes to the coloring pattern.

17. The computer program product of claim 16, wherein identifying the one or more attributes of the content comprises performing one or more of an image analysis, an audio analysis, or a relationship analysis to the content.

18. The computer program product of claim 16, wherein identifying the one or more attributes of the content comprises identifying a type of the content or a source of the content.

19. The computer program product of claim 16, wherein identifying the data structure mapping the one or more attributes to the coloring pattern comprises:
   identifying, if a matching data structure matches each of the one or more attributes, the matching data structure as the identified data structure; and
   identifying, if no data structure matches each of the one or more attributes, a nearest matching data structure as the identified data structure.

20. The computer program product of claim 19, wherein identifying, if no data structure matches each of the one or more attributes, the nearest matching data structure as the identified data structure is based on a priority of the one or more attributes.

* * * * *